United States Patent [19]

Finlay

[11] 4,103,356
[45] Jul. 25, 1978

[54] SYNCHRONIZED PUSH-PULL INVERTER

[75] Inventor: John Reid Finlay, Ottawa, Canada

[73] Assignee: Northern Telecom Limited, Montreal, Canada

[21] Appl. No.: 744,274

[22] Filed: Nov. 23, 1976

[51] Int. Cl.$^2$ ............................................. H02M 7/537
[52] U.S. Cl. ........................................ 363/22; 363/24; 331/47; 331/113 A
[58] Field of Search ................. 321/2, 16, 18, 45 R; 331/47, 113.1, 145; 363/22–25, 133, 134

[56] References Cited

U.S. PATENT DOCUMENTS

| 3,056,077 | 9/1962 | McCarter | 363/134 X |
| 3,206,694 | 9/1965 | Bates | 331/145 X |
| 3,319,180 | 5/1967 | Mesenhimer | 331/47 |
| 3,551,777 | 12/1970 | Bingley | 331/47 X |
| 3,617,857 | 11/1971 | Gunderson | 363/133 X |
| 3,938,023 | 2/1976 | Hutchinson | 321/18 X |

Primary Examiner—William M. Shoop
Attorney, Agent, or Firm—John E. Mowle

[57] ABSTRACT

A synchronization circuit for a free-running push-pull inverter in which the frequency is determined by a saturable transformer in the feedback loop. Synchronization is achieved by momentarily short-circuiting the inputs to the two switching transistors together to initiate the switching cycle.

4 Claims, 1 Drawing Figure

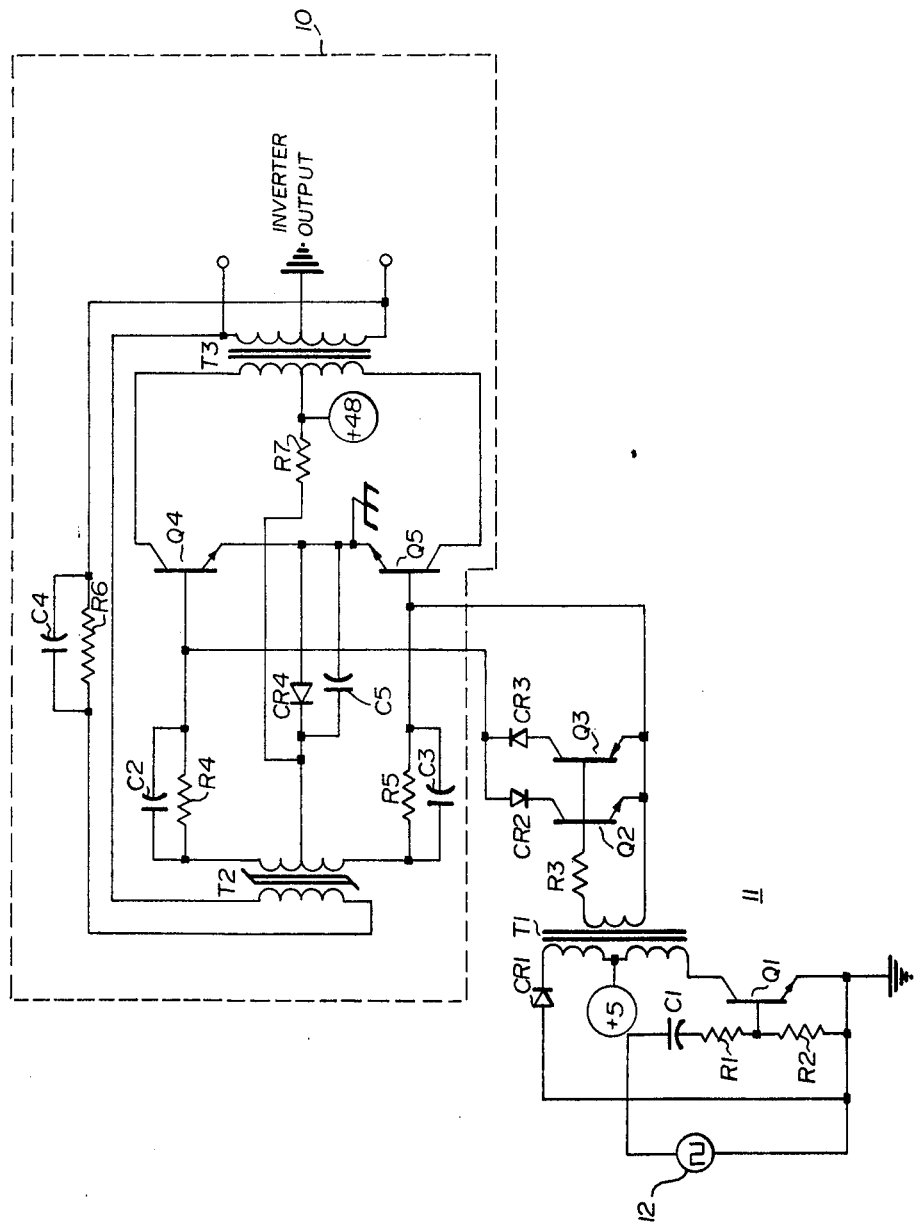

SYNCHRONIZED PUSH-PULL INVERTER

This invention relates to a push-pull inverter the free-running frequency of which is determined by a saturable transformer, and more particularly to a synchronization circuit for such an inverter.

BACKGROUND OF THE INVENTION

Various types of push-pull free-running inverters have been extensively used for converting one d-c voltage to another in power supply applications. Some utilize transistor circuitry for control of the various parameters including output voltage, current and frequency of the inverter.

One simple and reliable type of free-running inverter utilizes transformer feedback with frequency control being maintained by a saturable transformer in the feedback circuit. Several basic circuits of this type are disclosed in an article by James Lee Jensen entitled: "An Improved Square-wave Oscillator Circuit" IRE Transactions on Circuit Theory, Sept. 1957, pp 276–279. Where a number of such inverters are being utilized together, it is desirable that they be synchronized together in order to eliminate any low frequency beating effects. In applications where such a circuit is being used to power digital circuitry, it may be desirable to synchronize the inverter to a factoral frequency of the digital system clock. Any switching spikes produced by the inverter are then likely to occur when the digital system is changing states thus making it less susceptible to transient noise.

Synchronization control of such a basic circuit may be achieved in a number of ways such as by inducing a voltage spike across the primary of the saturable transformer to induce earlier saturation. However such an arrangement requires a change in the feedback circuitry parameters thereby adding another feedback control circuit with its attendant problems.

STATEMENT OF THE INVENTION

A very simple and economical way of achieving such synchronization in a saturable transformer controlled free-running inverter has been achieved by momentarily short-circuiting the bases of the push-pull switching transistors together at the synchronizing rate. Such a circuit is basically an open loop control system with minimal complexity and stability problems.

Thus, in accordance with the present invention there is provided a push-pull free-running inverter comprising a pair of switching transistors connected in a push-pull configuration to the primary of an output transformer. The inverter also includes coupling between the secondary of the output transformer and the primary of a saturable transformer, as well as coupling between opposed ends of the secondary of the saturable transformer and the respective bases of the pair of switching transistors. Synchronization is achieved in such an inverter by including a switching circuit which momentarily short-circuits the bases of the two transistors together at a rate at least twice that of the free-running frequency of the inverter so that the inverter is then synchronized to the switching circuit.

In one particular embodiment, the switching circuit includes a pair of complimentary transistors each connected in series aiding with a separate diode between the bases of the pair of switching transistors. In addition, the circuit includes circuitry for coupling a square-wave signal having a frequency at least as great as the free-running frequency of the inverter between the common bases and common emitters of the complimentary transistors. With this arrangement, the bases of the two switching transistors are short-circuited together once during each half cycle of the square-wave signal. Also, drive to the switching transistors is automatically terminated once the switching action commences due to the falling voltage being applied to the collector of the complimentary transistor which was momentarily turned on by the leading edge of the square-wave signal.

BRIEF DESCRIPTION OF THE DRAWING

An example embodiment of the invention will now be described with reference to the accompanying drawing which illustrates a free-running push-pull inverter which includes synchronization circuitry.

DESCRIPTION OF THE PREFERRED EMBODIMENT

Referring to the single FIGURE, the free-running inverter 10 comprises: a pair of NPN switching transistors Q4 and Q5 connected in a push-pull configuration across the primary of a centre tapped transformer T3. Output from the inverter is taken across a centre tapped secondary of the transformer T3. The opposed ends of the secondary are connected to the primary of a saturable transformer T2 through the combination of a shunt connected capacitor C4 and resistor R6. One end of the centre tapped secondary of the transformer T2 is coupled to the base of switching transistor Q4 via a capacitor C2 and resistor R4 connected in shunt. Similarly, the other end of the centre tapped secondary of transformer T2 is coupled to the base of transistor Q5 via a capacitor C3 and resistor R5 also connected in shunt. A +48 volt source of power for the inverter is connected between the centre tapped primary of transformer T3 and ground on the common emitters of the switching transistors Q4 and Q5. In addition, the inverter includes a start-up network comprising a resistor R7, a diode CR4 and a capacitor C5.

The synchronization circuit, generally 11, for the inverter 10 comprises a square-wave signal source 12 which is coupled through a series connected capacitor C1 to a voltage divider comprising resistors R1 and R2, the junction of which is connected to the base of a transistor Q1. The collector of transistor Q1 is connected to one end of a centre tap primary of a transformer T1 the other end of which is connected via a diode CR1 to ground. Power to this circuit is supplied from a +5 volt source to the centre tap of transformer T1.

The secondary of transformer T1 is coupled via a current limiting resistor R3 between the common bases and common emitters of complimentary transistors Q2 and Q3. The transistors Q2 and Q3 are each connected in series aiding relationship with diodes CR2 and CR3 respectively in their collector arms, between the bases of the two switching transistors Q4 and Q5.

In the free-running mode, when power is first applied to the inverter 10 from the +48 volt source, current commences to flow through resistor R7, the secondary of transformer T2, resistors R4, R5, through the transistors Q4 and Q5 to ground. At this point, diode CR4 is reverse biased and hence no current flows through it. Due to the unbalance between the two switching transistors Q4 and Q5, the inverter output switches in one direction which causes one transistor, say Q4, to turn hard on and the other, Q5, off. At this point in the cycle, the signal on the primary of saturable transformer T2 induces a voltage in the secondary of such polarity as to maintain transistor Q4 on. Current continues to flow out of the secondary of transformer T2 through resistor R4 into the base of transistor Q4 until the core of transformer T2 saturates, at which time the drive to transistor Q4 is cut off. At this point the output across the transformer T3 commences to reverse in a well known manner. This in turn applies a reverse voltage to the primary of transformer T2 thereby resetting the saturable transformer core and inducing a voltage on its secondary which turns on transistor Q5. The cycle continues alternately turning transistors Q4 and Q5 on and off. Resistor R6 in the feedback loop limits the current to the primary of transformer T2 during saturation. Capacitor C4 provides a momentary delay to insure that one of the switching transistors, Q4 or Q5 is turned off before the other is turned on. The resistors R4 and R5 limit the base current drawn by the transistors Q4 and Q5 respectively, while the capacitors C2, C3 and C5 assist in speeding up the switching action. The diode CR4 provides a return path for the base drive of switching transistors Q4 and Q5 while preventing a direct flow of current through resistor R7 from the +48 volt source to ground during start up.

During the synchronization mode, a square-wave signal from the signal source 12 is coupled through capacitor C1 and resistor R1 to the base of transistor Q1. This induces a square-wave in the secondary of transformer T1 which is applied simultaneously to the complimentary transistors Q2 and Q3 through resistor R3. Whenever the square-wave signal reverses, one or the other of transistors Q2 or Q3 conducts through its series aiding diodes CR2 or CR3 respectively. This effects a short-circuit between the bases of the two switching transistors Q4 and Q5 which in turn causes the conducting transistor to turn off. This causes the output voltage on the secondary of transformer T3 to reverse again in a well known manner. This cuts off the drive from the secondary of transformer T2 to the previously conducting switching transistor Q4 or Q5. The drop in drive voltage then causes the previously conducting transistors Q2 or Q3 to stop conducting. The diodes CR2 and CR3 prevent reverse conduction through the base-collector junctions of these transistors Q2 or Q3, while the resistor R3 limits the base drive current to the two transistors. The diode CR1 provides a return path which prevents a voltage transient being generated in the transformer T1 when the transistor Q1 is cut off.

In an alternate embodiment not shown, the emitter of NPN transistor Q2 is connected to the junction of resistor R5 - transformer T2, while an identical NPN transistor and diode combination is similarly connected between the base of transistor Q5 and the junction of resistor R4 - transformer T2. These latter elements take the place of the PNP transistor Q3 and diode CR3. With this arrangement, the base-emitters of the two NPN transistors are driven from separate secondary windings on transformer T1 each through current limiting resistors. Again, this effectively provides a periodic short circuit between the bases of the two switching transistors Q4 and Q5 to initiate the switching action.

In a typical application, the inverter is used to convert a +48 volt d-c supply to a 12 volt peak-to-peak square-wave output which can then be full-wave rectified to provide a 6 volt d-c output in a well known manner. The free-running frequency of the inverter is typically in the order of 25 KHz, whereas the frequency of the square-wave drive to the synchronization circuitry 12 is in the order of 32 KHz. As a result, the bases of the two transistors are momentarily short-circuited together at a 64 KHz rate. It is to be noted that with this arrangement, the synchronization frequency from the square-wave generator 12 must be at least as great as the free-running frequency of the inverter 10, otherwise the circuit will revert to a semi-free-running mode.

What is claimed is:

1. In a push-pull free-running inverter comprising:
a pair of switching transistors connected in a push-pull configuration to the primary of an output transformer;
means for coupling the secondary of said output transformer to the primary of a saturable transformer;
means for coupling opposed ends of the secondary of said saturable transformer to the respective bases of the pair of switching transistors;
the improvement comprising:
a pair of control transistors;
means including a diode connecting the emitter-collector of each control transistor between the bases of the pair of switching transistors;
means for applying a square-wave signal having a frequency at least as great as the free-running frequency of the inverter between the base-emitter of each of the control transistors to alternately gate said control transistors on during alternate half-cycles of the square-wave signal,
whereby the inverter is synchronized to the square-wave signal.

2. An inverter as defined in claim 1 in which the pair of control transistors are:
a pair of complimentary transistors having their bases and emitters connected in shunt; and
each complimentary transistor having a diode connected in series aiding with its collector, between the bases of the pair of switching transistors.

3. An inverter as defined in claim 2 in which the means for coupling the secondary of said output transformer to the primary of a saturable transformer includes a shunt connected first resistor and capacitor connected in series therewith, and in which the means for coupling opposed ends of the secondary to said saturable transformer to the respective bases of the pair of switching transistors includes a shunt connected second resistor and capacitor connected in series with one base, and a shunt connected third resistor and capacitor connected in series with the other base.

4. In a push-pull free-running inverter comprising:
a pair of switching transistors connected in a push-pull configuration to the primary of an output transformer;
means for coupling the secondary of said output transformer to the primary of a saturable transformer;
means for coupling respective ends of a secondary of said saturable transformer to the bases of the switching transistors;
means for coupling the centre tap of the secondary of the saturable transformer to the two emitters of the switching transistors;
the improvement comprising:

a pair of complimentary transistors each connected in series aiding with a separate diode between the bases of the pair of switching transistors; and means for coupling a square-wave signal, having a frequency at least as great as the free-running frequency of the inverter, between the common bases and emitters of the complimentary transistors to alternately gate said complimentary transistors on during alternate half-cycles of the square-wave signal, whereby the inverter is synchronized to the square-wave signal.

* * * * *